United States Patent
Tamil

(10) Patent No.: US 7,526,203 B2
(45) Date of Patent: *Apr. 28, 2009

(54) APPARATUS AND METHOD FOR OPTICAL SWITCHING AT AN OPTICAL SWITCH FABRIC

(75) Inventor: Lakshman S. Tamil, Plano, TX (US)

(73) Assignee: YT Networks Capital, LLC, Wilmington, DE (US)

( * ) Notice: Subject to any disclaimer, the term of this patent is extended or adjusted under 35 U.S.C. 154(b) by 588 days.

This patent is subject to a terminal disclaimer.

(21) Appl. No.: 10/659,485

(22) Filed: Sep. 10, 2003

(65) Prior Publication Data

US 2006/0083460 A1    Apr. 20, 2006

Related U.S. Application Data

(63) Continuation-in-part of application No. 09/698,666, filed on Oct. 27, 2000, now Pat. No. 6,665,495.

(51) Int. Cl.
   *H04J 14/08* (2006.01)
(52) U.S. Cl. .............................. 398/54; 398/47; 398/51
(58) Field of Classification Search ............. 398/46–51, 398/52–54
   See application file for complete search history.

(56) References Cited

U.S. PATENT DOCUMENTS 4,747,650 A    5/1988    Sakuda (Continued)

FOREIGN PATENT DOCUMENTS

EP    0 849 916 A2    6/1998

(Continued)

OTHER PUBLICATIONS

G. Depovere, et al., "*A Flexible Cross-Connect Network Using Multiple Object Carriers*," Philips Research Laboratories, all pages, Unknown.

(Continued)

*Primary Examiner*—Leslie Pascal
(74) *Attorney, Agent, or Firm*—Connolly Bove Lodge & Hutz LLP; Myron Keith Wyche

(57) ABSTRACT

Embodiments of the present invention provide a system and method for providing non-blocking routing of optical data through an optical switch fabric.

The optical switch fabric can include an optical switching matrix with a plurality of inputs intersecting with a plurality of outputs. A path switch can be located at each intersection that is operable to switch data arriving on an input to a particular output. The path switches can be configurable to create a plurality of unique paths through the optical switching matrix to allow routing in a non-blocking manner.

Another aspect of the present invention can provide a system and method for providing non-blocking routing through an optical cross-bar switch. The optical cross-bar switch includes a plurality of input links, a plurality of output links and a plurality of switching elements. Each switching element can include a plurality of path switches connecting each of the input links to at least one of the output links and the plurality of switching elements can be configured to create a plurality of unique paths through the optical cross-bar switch.

63 Claims, 6 Drawing Sheets

U.S. PATENT DOCUMENTS

| | | | |
|---|---|---|---|
| 5,253,248 | A | 10/1993 | Dravida et al. |
| 5,303,078 | A | 4/1994 | Brackett et al. |
| 5,327,552 | A | 7/1994 | Liew |
| 5,351,146 | A | 9/1994 | Chan et al. |
| 5,416,769 | A | 5/1995 | Karol |
| 5,469,284 | A | 11/1995 | Haas |
| 5,477,530 | A | 12/1995 | Ahmadi et al. |
| 5,486,943 | A | 1/1996 | Sasayama et al. |
| 5,617,413 | A | 4/1997 | Monacos |
| 5,734,486 | A | 3/1998 | Guillemot et al. |
| 5,737,106 | A | 4/1998 | Sansonetti et al. |
| 5,757,526 | A * | 5/1998 | Shiragaki et al. .............. 398/20 |
| 5,848,055 | A | 12/1998 | Fedyk et al. |
| 5,978,359 | A | 11/1999 | Caldara et al. |
| 6,005,698 | A * | 12/1999 | Huber et al. .................. 398/50 |
| 6,023,456 | A | 2/2000 | Chapman |
| 6,052,726 | A | 4/2000 | Fontenot |
| 6,345,040 | B1 | 2/2002 | Stephens et al. |
| 6,501,869 | B1 * | 12/2002 | Athale ......................... 385/18 |
| 6,542,268 | B1 | 4/2003 | Rotolo et al. |
| 6,567,408 | B1 | 5/2003 | Lee |
| 6,665,495 | B1 | 12/2003 | Miles et al. |
| 6,674,754 | B1 * | 1/2004 | Ofek ......................... 370/389 |
| 6,721,315 | B1 * | 4/2004 | Xiong et al. ................. 370/389 |
| 6,763,192 | B1 * | 7/2004 | Jagannathan ................. 398/54 |
| 6,782,201 | B2 * | 8/2004 | Yamamoto et al. ............ 398/59 |
| 6,819,870 | B1 | 11/2004 | Ge et al. |
| 6,834,310 | B2 | 12/2004 | Munger et al. |
| 6,859,579 | B2 * | 2/2005 | Shiozawa et al. ............. 385/18 |
| 6,928,244 | B1 * | 8/2005 | Goldstein et al. ............ 398/45 |
| 7,068,871 | B2 * | 6/2006 | Sugama et al. ............... 385/14 |
| 2002/0015551 | A1 * | 2/2002 | Rosen ........................ 425/325 |
| 2002/0048066 | A1 * | 4/2002 | Antoniades et al. ......... 359/128 |
| 2002/0080446 | A1 * | 6/2002 | Derventzis et al. .......... 359/128 |
| 2002/0101869 | A1 | 8/2002 | Garcia-Luna-Aceves |
| 2002/0163693 | A1 * | 11/2002 | Rubissa et al. .............. 359/128 |
| 2003/0030866 | A1 | 2/2003 | Yoo |
| 2003/0063348 | A1 * | 4/2003 | Posey, Jr. .................... 359/139 |
| 2003/0067653 | A1 | 4/2003 | Aicklen |
| 2004/0151171 | A1 * | 8/2004 | Lee et al. .................... 370/380 |

FOREIGN PATENT DOCUMENTS

| | | |
|---|---|---|
| WO | WO 95/30318 A2 | 11/1995 |
| WO | WO 00/42811 A1 | 7/2000 |

OTHER PUBLICATIONS

John M. Senior, et al., "*All-Optical Networking 1999: Architecture, Control, and Management Issues*," SPIE—The International Society for Optical Engineering, vol. 3843, pp. 111-119 Sep. 19-21, 1999.

Jonathan S. Turner, "*Terabit Burst Switching*," Journal of High Speed Networks 8 (1999) 3-16 IOS Press, pp. 3-16.

Ken-ichi Sato, "*Network Performance and Integrity Enhancement with Optical Path Layer Technologies*," IEEE Journal of Selected Areas in Communications, Jan. 1994, vol. 12, No. 1, pp. 159-170.

F. Callegati, et al., "*Architecture and Performance of a Broadcast and Select Photnic Switch*," Optical Fiber Technology 4, 1998, pp. 266-284.

Soeren Lykke Danielsen, et al., "*WDM Packet Switch Architectures and Analysis of the Influence of Tuneable Wavelength Converters of the Performance*," IEEE Journal of Lightwave Technology, Feb. 1997, vol. 15, No. 2, pp. 219-227.

Soeren L. Danielsen, et al., "*Optical Packet Switched Network Layer Without Optical Buffers*," IEEE Photonics Technology Letters, Jun. 1998, vol. 10, No. 6.

John M. Senior, et al., "*All-Optical Networking: Architecture, Control and Management Issues*," SPIE—The International Society of Optical Engineering, Nov. 3-5, 1998, vol. 3531, pp. 455-464.

M.C. Chia, et al., "*Performance of Feedback and Feedforward Arrayed—Waveguide Gratings-Based Optical Packet Switches with WDM Inputs/Outputs*," Part of SPIE Conference on All-Optical Networking: Architecture, Control and Management Issues, Nov. 1998, vol. 3531, pp. 306-314.

International Search Report for PCT/US01/51237, Mailed Mar. 20, 2003.

Kannan, et al., "*A High Bandwidth Space-Time-Wavelength Multiplexed Optical Switching Network*," Proceeding of the IEEE INFOCOM '97, Los Alamitos, CA, pp. 777-784, Apr. 7-12, 1997.

McKeown, et al., "*Tiny Tera: A Packet Switch Core*," IEEE MICRO, IEEE Inc., Jan. 1997, New York, vol. 17, No. 1, pp. 26-33.

Borgonovo et al. Unslotted deflection routing in all-optical networks; Global Telecommunications Conference, Nov. 29-Dec. 2, 1993, including a Communication Theory Mini-Conference. Technical Program Conference Record, IEEE in Houston. GLOBECOM '93., IEEE.

Chevalier et al. "A new packet routing strategy for ultra-fast photonic networks", Dept. of Electron & Electr. Eng., Strathclyde Univ., Glasgow; This paper appears in: Global Telecommunications Conference, 1998, GLOBECOM '93., "*The Bridge to Global Integratio*".

Bannister et al., "A performance model of deflection routing in multibuffer networks with non-uniform traffic Networking," IEEE/ACM Transactions on vol. 3, issue 5, pp. 509-520, Oct. 1995.

Hunter, David K., "Buffering in optical packet switches", *Jrnl. Of Lightwave Technology*, vol. 16:12, pp. 2081-2094, Dec. 1998.

Borgonovo et al. "On the design of optical deflection-routing networks", *INFOCOM '94. Networking for Global Communications. 13th Proceedings IEEE*, Publication Date: Jun. 12-16, 1994, pp. 120-129, vol. 1, Meeting Date: Jun. 12, 1194-Jun. 16, 1994.

Li et al., "Deflection Routing in Slotted Self-Routing Networks with Arbitrary Topology," *IEEE Jrnl. On Selected Areas in Communications*, vol. 22:9, pp. 1812-1822, Nov. 2004.

* cited by examiner

APPARATUS AND METHOD FOR OPTICAL SWITCHING AT AN OPTICAL SWITCH FABRIC

RELATED INFORMATION

This application claims priority to and is a continuation in part of U.S. patent application Ser. No. 09/698,666, entitled "Non-Blocking, Scalable Optical Router Architecture and Method for Routing Optical Traffic", filed on Oct. 27, 2000 and issued as U.S. Pat. No. 6,665,495 to Miles et al. on Dec. 16, 2003, which is hereby fully incorporated by reference.

TECHNICAL FIELD OF THE INVENTION

The present invention relates generally to telecommunications systems and methods, and more particularly, to an optical cross-bar switch having an architecture to optimize the switching of optical data packets.

BACKGROUND OF THE INVENTION

The emergence of the Internet and the reliance by businesses and consumers on the transfer of data in an increasing number of daily activities requires telecommunications networks and components that can deliver ever increasing amounts of data at faster speeds with higher quality levels. Current telecommunications networks fail to meet these requirements.

Existing electrical and electro-optical switching routers are limited in the switching speeds that are attained and the data capacity that can be processed between switches in a non-blocking manner. Current electrical switching architectures are generally limited to a switching speed of 40-100 Gigabits. In an attempt to overcome this limitation, current electrical and optical routers use aggregation of slower switches to increase the overall switching speed of the router. For example, a system may combine one hundred (100) one (1) Gigabit routers to increase the switching speed of the system. However, while the overall speed and capacity will exceed one Gigabit, this aggregation will not result in full 100 Gigabit per second speed and capacity, resulting in a decreased efficiency (less than full realization of the switching capability). Furthermore, aggregation increases costs due to the increased number of routers and increases complexity due to interconnect and routing issues. In addition to the issues surrounding data routing speed, electronic telecommunication routing systems all face difficult transference issues when interfacing with optical data packets.

Another technique used in electrical telecommunication routing systems to increase data routing speed is parallel processing. However, this technique has its own limitations including control complexity (it is difficult to control the multiple routers operating in parallel). In any of these techniques involving multiple routers to increase the processing speed, a single control machine must arbitrate among the many multiple machines, which increases control complexity, cost and ultimately uses an electronic control machine that is limited by electronic processing speeds.

FIGS. 1 and 2 will illustrate the limitations of these prior art systems. FIG. 1 shows a typical prior art local network cluster 10 that uses an interconnect structure with multiple routers and switches to provide the local geographic area with a bandwidth capability greater than that possible with any one switch in the network 10. Network 10 includes four routers 12, which will be assumed to be 300 Gigabit per second routers, each of which serves a separate area of 150 Gbps of local traffic. Thus, the 300 Gigabit capacity is divided by assigning 150 Gigabits per second (Gbps) to the incoming traffic on local traffic links 16 and assigning 50 Gbps to each of three links 14. Thus, each link 14 connects the router 12 to every other router in the network 10, thereby consuming the other 150 gigabit capacity of the router 12. This interconnectivity is in the form of a "mesh" that allows each router 12 to communicate directly with every other router 12 in the network 10.

This configuration has a number of limitations. While the four local geographic area produce a total of 600 Gbps of capacity, the network 10 requires four routers 12 of 300 Gbps each, or 1200 Gbps of total router capacity, to provide the interconnectivity required to allow direct communication between all routers 12. Additionally, even though fully connected, each router 12 does not have access to all of the capacity from any other router 12. Thus, only one third of the local traffic (i.e., only 50 Gbps of the total potential 150 Gbps) can be switched directly from any one router 12 to another router 12, and the total potential traffic demand is 600 Gigabits per second. In order to carry more traffic over a link 14, a larger capacity would be required at each router 12 (for example, to carry all 150 Gbps over a link 14 between routers, each link 14 would need to be a 150 Gbps link and each router 12 would have to have an additional 300 Gbps capacity). Thus, to get full connectivity and full capacity, a non-blocking cluster network 10 having a mesh configuration would require routers with 600 Gbps capacity each which equates to 2400 Gbps total router capacity (or four times the combined traffic capacity of the local geographic areas).

FIG. 2 shows another prior art cluster router network 18 that aggregates sixteen data links 20 that each can carry up to one hundred sixty gigabits per second of data, thus appearing to have the potential capacity of 2.5 Terabits (16 links carrying 160 Gbps each). Each of the data links 20 is routed through an edge router 22 to an interconnected edge network 24 (e.g., a ring, mesh, ADM backbone or other known interconnection method) via carrying links 26. However, due to inefficiencies in this network configuration (as described above), the full potential of 2.5 Terabits cannot be achieved without a tremendous increase in the size of the edge routers 22. For example, if the edge routers are each 320 Gbps routers, then 160 Gbps is used to take incoming data from incoming data link 20 and only 160 Gbps of access remains to send data to each of the other fifteen routers 22 in the cluster 18 (i.e., approximately 10 Gbps can be allotted to each of the other fifteen routers, resulting in greater than 90% blockage of data between routers). Furthermore, the capacity of the routers is already underutilized as the overall router capacity of the network cluster 18 is 5 terabits per second (Tbps), while the data capacity actually being serviced is 2.5 Tbps. Even with the router capacity underutilized, the network 18 has over 90% blockage between interconnected routers through the edge network 24. To increase the capacity between routers in a non-blocking manner, the individual routers would need to be increased in capacity tremendously, which increases cost and further exacerbates the under-utilization problems already existing in the network.

Therefore, a need exists for a switching architecture that will provide full, non-blocking routing that will allow full capacity utilization without requiring over-sized routers and that will not result in extreme under-utilization of the router capacity and tremendous increase in router costs over the network.

SUMMARY OF THE PRESENT INVENTION

The present invention provides a non-blocking optical routing system and method that substantially eliminates or reduces disadvantages and problems associated with previously developed optical routing systems and methods.

More specifically, the present invention provides a system and method for providing non-blocking routing of optical data through an optical switch fabric. The optical switch fabric can include an optical switching matrix with a plurality of inputs intersecting with a plurality of outputs. A path switch can be located at each intersection that is operable to switch data arriving on an input to a particular output. The path switches can be configurable to create a plurality of unique paths through the optical switching matrix to allow routing in a non-blocking manner.

Another aspect of the present invention can provide a system and method for providing non-blocking routing through an optical cross-bar switch. The optical cross-bar switch includes a plurality of input links, a plurality of output links and a plurality of switching elements. Each switching element can include a plurality of path switches connecting each of the input links to at least one of the output links and the plurality of switching elements can be configured to create a plurality of unique paths through the optical cross-bar switch. Data packets arriving on the various input links can be switched to different output links such that no two input links are communicating data packets to the same output link in an identical switching period. One embodiment of the optical cross-bar switch can also include a packet schedule that establishes a schedule pattern for the optical cross-bar switch and a switch controller that can configure the optical cross-bar switch according to the schedule pattern. Based on the schedule pattern, the switch controller can send control signals to each of the switching elements via switching links. The control signals prompt the switching elements to open or close path switches to create the plurality of unique paths through the optical cross-bar switch.

Embodiments of the present invention provide an important technical advantage with respect to previous optical routing systems and methods by providing non-blocking routing of optical data packets without increasing the router/switch capacity beyond the capacity that is being served.

Embodiments of the present invention provide another important technical advantage by providing an optical cross-bar switch fabric that includes a unique switch path from each input link to each output link, to ensure that no blocking or congestion will occur in the switch fabric.

Embodiments of the present invention provide yet another important technical advantage by providing the ability to broadcast and multicast data packets without blocking or contention.

Embodiments of the present invention provide yet another important technical advantage providing a scalable switch fabric architecture that can accommodate the ability to send a greater number of wavelengths across a single optical link.

Embodiments of the present invention provide yet another important technical advantage by being highly scalable.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

The present invention provides an optical switch architecture that provides full, non-blocking interconnectivity without increasing the router/switch capacity beyond that required to service the data capacity coming into the router/switch from the network communities being serviced. The present invention provides routing for fixed and variable length optical data packets of varying types (including Internet Protocol (IP), data, voice, TDM, ATM, voice over data, etc.) at speeds from sub-Terabit per second (Tbps) to significantly in excess of Petabit per second (Pbps). The present invention utilizes a unique, non-blocking optical switching architecture to obtain these benefits in speed and interconnected capacity.

Figure 3:
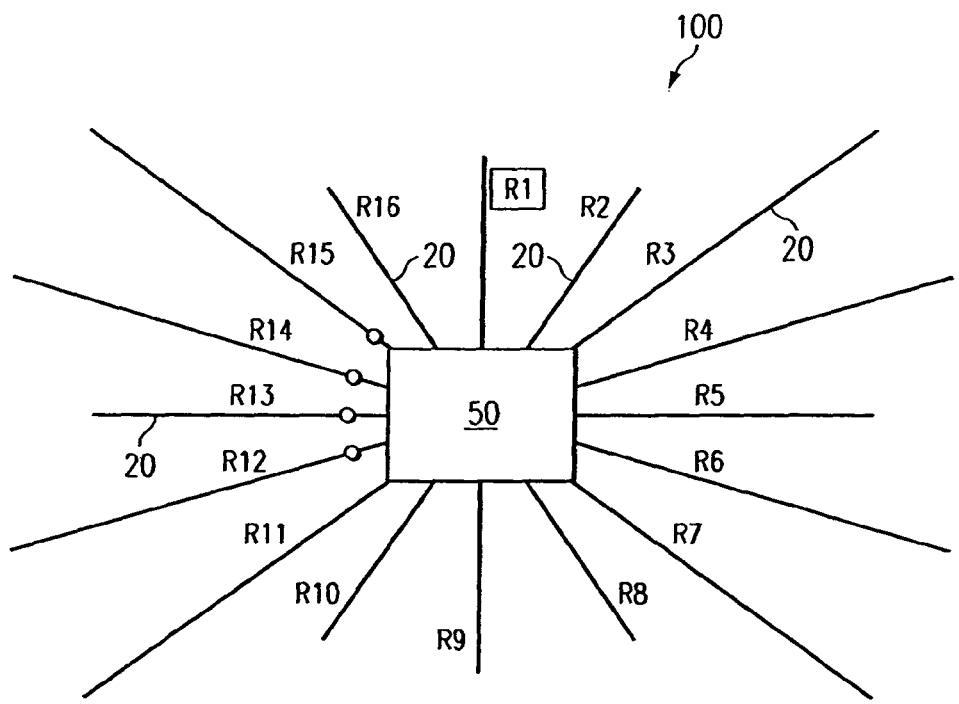
FIG. 3 is a diagram representing one embodiment of an optical telecommunications network incorporating a non-blocking optical switch fabric according to the present invention.
Figure 2:
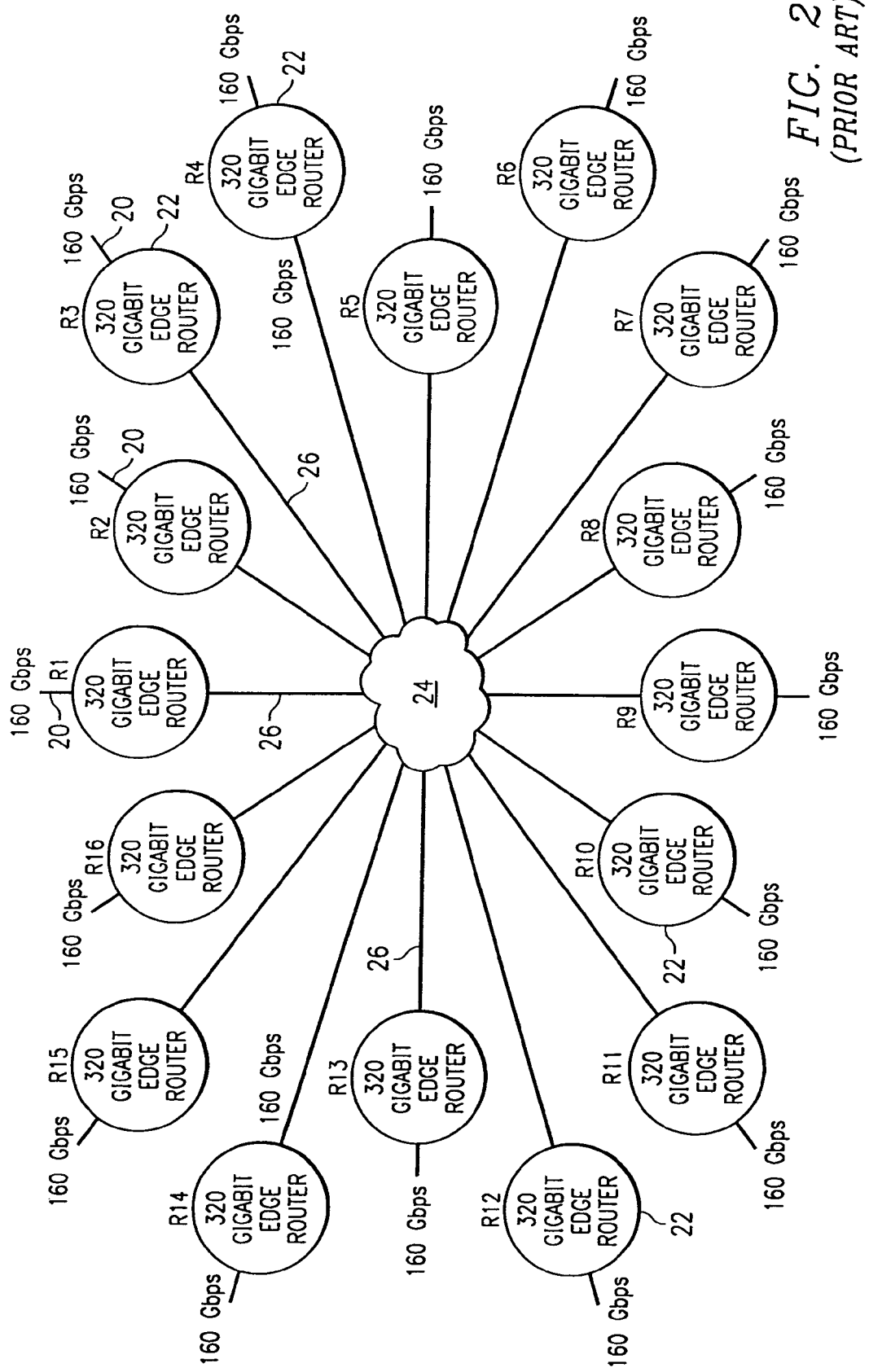
FIG. 2 shows another prior art telecommunications router configuration.

FIG. 3 shows an optical network 100 including a number of data lines 20 (or "data links 20") carrying optical data directly to a central optical router 50 utilizing the optical switching architecture of the present invention. The data links 20 can be optical links comprising fiber optic cable operable to carry optical data packets. The network 100 embodiment shown in FIG. 3 includes sixteen data links 20 where each data link has a data capacity of 160 Gigabits per second (Gbps). Therefore, the network 100 of FIG. 3 has the same potential data capacity of the network of FIG. 2 (approximately 2.5 Tbps). However, unlike FIG. 2, the optical network 100 of FIG. 3 has replaced the sixteen individual routers 12 and the interconnected edge network 24 with a single optical router 50 having an embodiment of the switch architecture according to the present invention. Each of the data links 20 transmits optical data packets directly to optical router 50 for further processing. The optical router 50 can route any amount of data received from any single data link 20 to any other data link 20 in a non-blocking manner via the optical switch fabric of the present invention, thus providing full interconnectivity between data links 20 in the network 100 and thereby providing the potential for full capacity utilization. The optical router 50 optimizes bandwidth management to maximize throughput from ingress ports to egress ports in the router 50 with little or no data loss due to data packet congestion or conflict. As compared to the prior art of FIG. 2, the router implementing the optical switching fabric of present invention has eliminated the intermediate routers (and their associated underutilized capacity) and the interconnected edge network with a single optical router 50.

Figure 1:
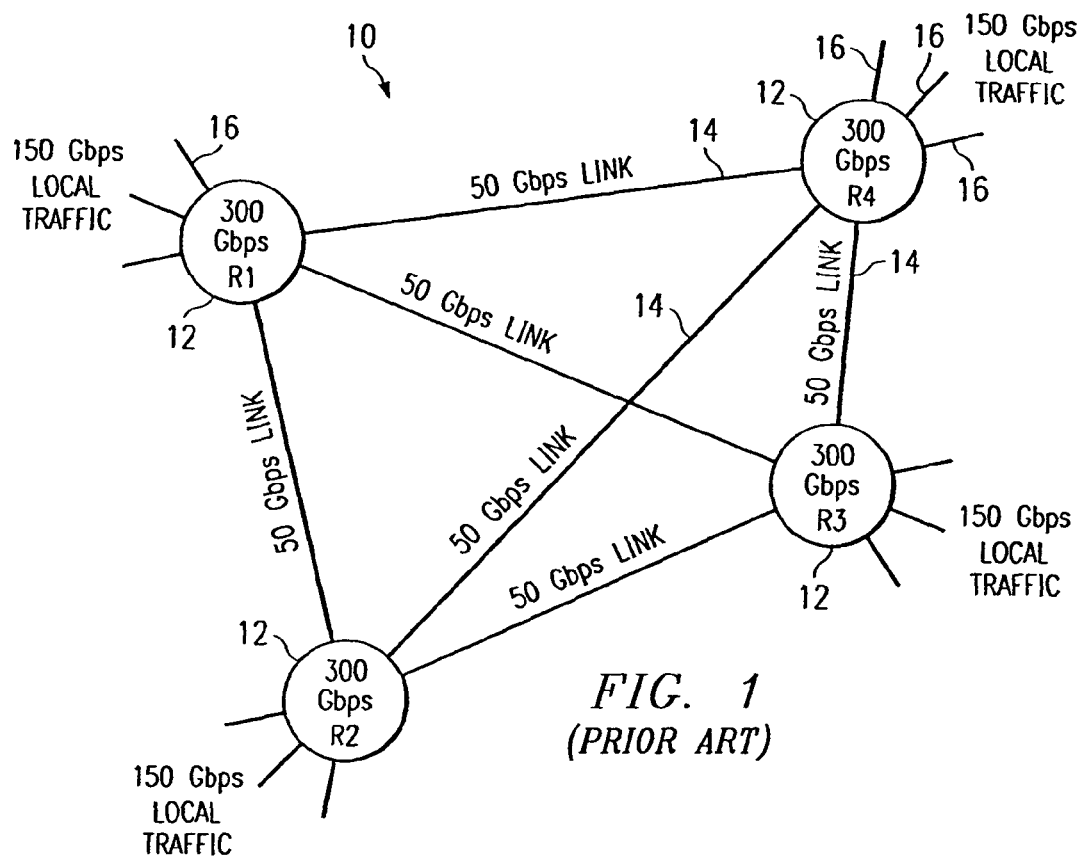
FIG. 1 shows a prior art telecommunications router network.

It should be understood that while many of the specific embodiments shown in the FIGURES will describe a 2.5 Tbps network architecture with a sixteen link, 160 Gbps per link and a 2.5 Tbps optical router, embodiments of the present invention are fully scalable to comprise different numbers of links, different link I/O formats, different data capacities per links, different sized optical routers and other different formats/capacities. Thus, routers utilizing the embodiment of the switch fabric architecture of the present invention are fully applicable to networks with total data transport capacities much less than 1 Tbps and significantly in excess of 1 Pbps and the general architectures described are not in any way limited to this specific 2.5 Tbps embodiment which is provided by way of example only. It should be further understood that the "optical router 50" can include the functions of switching and routing and is not limited to traditional "routing" functions. For example, the optical router 50 can replace constant bandwidth switches that are used in public switched transport network that exists today that carries constant bandwidth voice or video data (e.g., TDM data). Additionally, the optical router 50 can be deployed in both a single system (non-distributed) and in a distributed version of the system. While the FIGUREs generally illustrate a single, co-located system architecture, the present invention is equally applicable to a distributed network that uses optical routers utilizing the optical switching architecture of the present invention to replace traditional routers such as those described in FIGS. 1 and 2.

Figure 4:
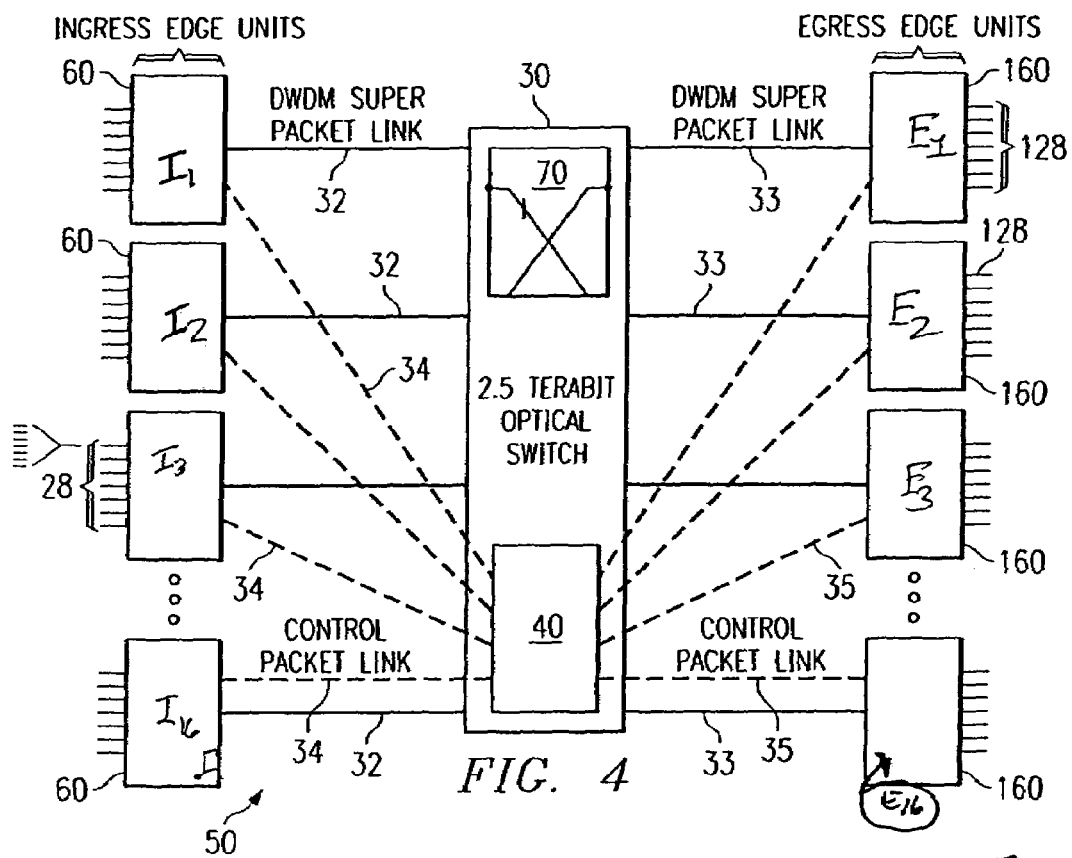
FIG. 4 shows one embodiment of the optical router incorporating a non-blocking optical switch fabric of the present invention.

FIG. 4 shows an embodiment of the optical core node or optical router 50 employing an embodiment of the optical switching architecture of the present invention. The optical router 50 includes an optical switch core 30, that comprises an optical switch fabric 70 and a core controller 40 that manages the routing through the optical switch fabric 70, a plurality of ingress edge units 60 linked to the optical switch fabric 70 via a plurality of ingress super packet links 32 and linked to the core controller 40 via a plurality of ingress control packet links 34, and a plurality of egress edge units 160 linked to the optical switch fabric 70 via a plurality of egress super packet links 33 and linked to the core controller 40 via a plurality of egress control packet links 35. It should be understood that the super packet links 32 and the control packet links 33 can both comprise WDM fibers or ribbon. It should be further understood that the control packet links and super packet links can either comprise separate physical fibers/links or can combine a single physical fiber/link for both the control and data paths. Thus, the optical switch core 30 is interconnected to a plurality of edge units 60 and 160 that interface between the data links 20 and the optical switch core 30.

Combined edge units can be built as a single physical edge unit that includes both an ingress unit 60 and an egress unit 160 and that can perform both ingress (input) and egress (output) functions. Each ingress edge unit 60 and each egress edge unit 160 can contain many ingress and egress ports (of different types), respectively, that can connect to a range of other optical network elements, such as smaller switches, routers, cross-connects, and/or transmission equipment that may require consolidation of large amounts of optical data. Similarly, switch core 30 can comprise a single switch core, or alternatively, can comprise a stack of switch cores or a multiple plane switch core.

In operation, one embodiment of the ingress edge unit 60 can receive the optical data packets and can convert the optical data packets to electrical data packets. Each ingress edge unit 60 can aggregate data packets (in electrical form) into egress addressable super packets for transmission over the ingress super packet links 32, through the optical switch core 30, and over egress super packet links 33 to an egress edge unit 160. Thus, ingress edge units 60 receive data from data links 20, aggregate the data into super packets where each super packet contains data intended for the same egress edge unit 160, forward the data in super packet form over ingress super packet links 32 to the optical switch fabric 70 in optical switch core 30. At the optical switch core 30, the switching/routing operations occur, as will be described more fully below, and then the data can flow in packet or super packet form over egress super packet links 33 to the appropriate egress edge unit(s) 160 and output to data link(s) 20. A "super packet" as used herein is an aggregated optical data packet that includes the data from multiple optical data packets arriving at ingress edge units 60 that are intended for the same egress destination. It should be noted that while the present invention is described primarily in the context of routing super packets, the present invention is equally applicable to routing individual optical data packets. Additionally, each ingress edge unit can mulitplex together data packets that are destined for the same egress edge unit. Each ingress edge unit 60 also connects to the core controller 40 via ingress control packet links 34 that carry control data packets to and from the core controller 40 to provide control data from each of the ingress edge units 60 that is used by the core controller 40 to perform the switch and routing management functions of the optical router 50.

Each ingress edge unit 60 is shown in FIG. 4 receiving data from input/output links 28 that interface between the ingress edge unit 60 and the data links 20 (through any number of smaller switches, routers, cross connects and/or transmission equipment). The input/output links 28 can be, for example, standard network interface port cards (e.g., OC-48 packet-over-SONET port cards, OC-192 packet-over-SONET port cards, Gigabit Ethernet port cards, etc.), DWDM interface port cards for aggregating multiple signals or other equally functional input/output units. Thus, the port itself could process multiple signal types aggregated into one or more input links. The input/output links 28 need simply have the capacity to receive and send the amount of data provided over data links 20.

FIG. 4 shows a specific embodiment of a router 50 utilizing an embodiment of the optical switch architecture according to the present invention, however, it should be understood that the numerical values, ratios, etc. are exemplary only and that the present invention can be utilized with any number of ingress edge units and egress edge units and any capacity of super packet links, as long as the number of wavelengths times the capacity matches or exceeds the incoming capacity. In the embodiment shown in FIG. 4, there are sixteen ingress edge units 60 (labeled I1, I2, I3, . . . I16) and sixteen corresponding egress edge units 160 (labeled E1, E2, E3 . . . E16), that each has the capacity to send and receive 160 Gbps of optical data. In the FIG. 4 embodiment, each ingress edge unit 60 and each egress edge unit 160 has sixteen input/output links (items 28 and 128, respectively) where each of the sixteen input/output link groups connects to one of the sixteen data links 20 and must be able to send/receive 160 Gbps of data from and to the data links 20. In this embodiment of a router implementing the optical switch fabric of the present invention, each ingress edge unit 60 is connected to the optical switch core 30 through the single optical fiber ingress super packet link 32 that can carry sixteen wavelengths ($\lambda$), where each wavelength carries 10 Gbps each (to give a total carrying capacity across super packet link 26 of 160 Gbps). The total of sixteen 160 Gbps ingress super packet links 32 (and the corresponding sixteen 160 Gbps egress super packet links 33) provide the 2.5 Tbps capacity of the optical router 50.

The optical switch fabric 70 of optical router 50 will allow all of the data, or any fraction thereof, to be transferred from the ingress to egress edges in a non-blocking manner (e.g., all of the data from ingress edge unit I1 can go to egress edge unit E2, while at the same time all of the data from ingress I16 goes to egress E1). Thus, every data packet arriving at an ingress edge unit 60 can be routed to an egress edge unit 160 without contention with any other data packet so long as the capacity of each of the individual ingress super packet links 32 and egress super packet links 33 is not exceeded. In other words, the egress super packet link 33 capacity to the egress edge unit 160 cannot be exceeded (e.g., in this embodiment 160 Gbps). The core controller 40 manages this control feature to ensure that this egress super packet link 33 capacity is not exceeded. In this manner, any portion of the input data at any ingress unit 60 can be routed simultaneous to any egress edge unit 160.

Figure 5:
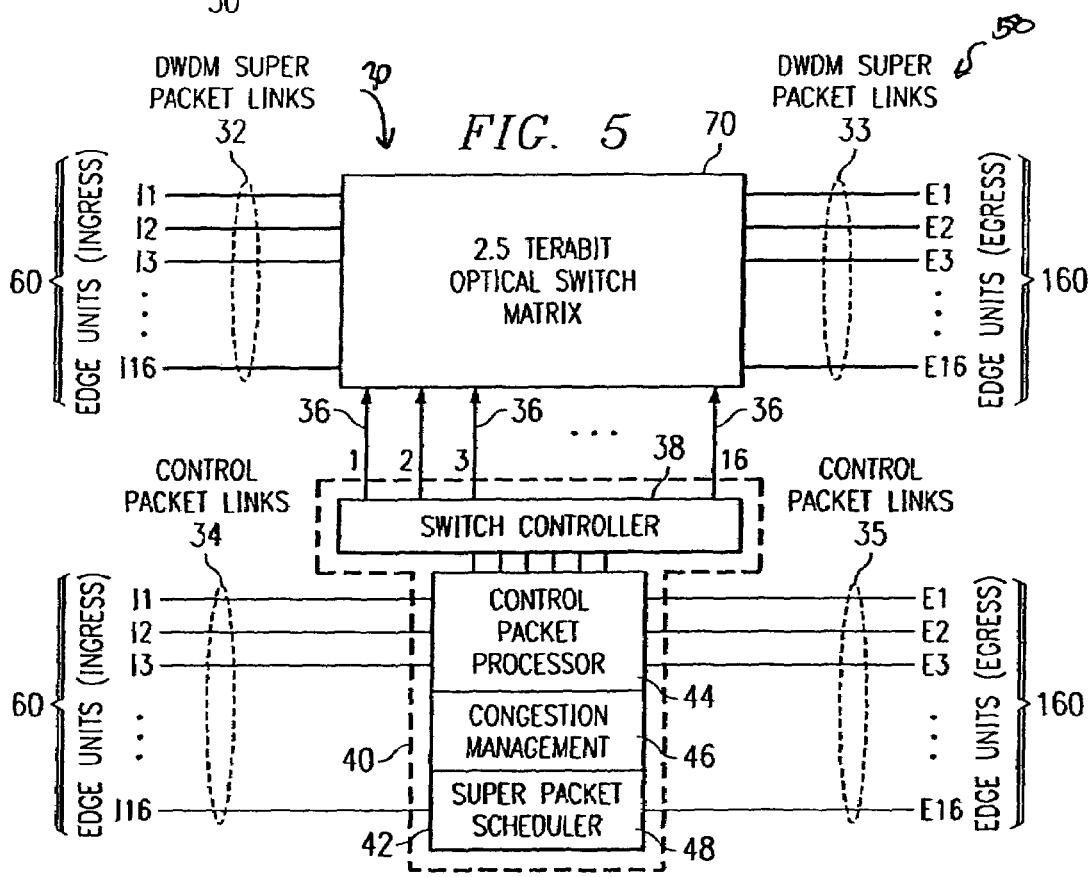
FIG. 5 is a more detailed view of an optical switch fabric and an optical core controller for the optical router of FIG. 4.

FIG. 5 shows a non-blocking embodiment of the optical switch core 30 of FIG. 4 in further detail. As previously described, the optical switch core 30 includes optical switch fabric 70 connected to edge units 60 via super packet links, and core controller 40 connected to edge units via control packet links. As shown in FIG. 5, core controller 40 can comprise a super packet scheduler 42 (which is the portion of the core controller 40 that communicates with the ingress edge units 60 through the ingress control packet links 34 and with the egress edge units 160 through the egress control packet links 35), and a switch controller 38 that is in communication between the packet scheduler 42 and the optical switch fabric 70 to coordinate the actual switching within the optical switch fabric 70 based on the information processed from the ingress edge units 60. The super packet scheduler 42 can be a single unit that performs the super packet scheduling and control, or can comprise multiple modules. In an alternative embodiment, the super packet scheduler can further comprise separate modules including a control packet processor module 44, a congestion management module 46 and a scheduler module 48. In the context of the present invention, the congestion management performed by the congestion management module 46 can include monitoring, reserving and allocating a path through the router 50 to avoid congestion. The switch controller 38 may be an electrical control device and can communicate with the optical switch fabric 70 through one or more switch links 36 through which the core controller 40 can apply the pattern (i.e., schedule) to the optical switch fabric 70.

The optical router 50 allows the non-blocking feature of the present invention by utilization of the optical switch fabric 70's non-blocking paths from each ingress edge unit 60 to each egress edge unit 160 to allow the flow of super packets without contention within the optical switch fabric 70. In order to assure the transmission to the given egress edge unit 160 is accomplished without collision or data loss, the switch core controller 40 can communicate with each ingress edge unit 60 over ingress control packet links 34 in order to determine the incoming data destination requirements, schedule multiplexing of data packets and schedule transmission of the aggregated super packets between ingress and egress edge interface functions to avoid collision or congestion.

The core controller 40 can perform at least three distinct control functions within the optical router 50: (i) overall synchronization of data flow in the optical router 50 for both ingress edge units 60 and egress edge units 160; (ii) establishing patterns for delivery of super packets from the ingress edge units 60 to the optical switch fabric 70 and (iii) examination of the super packet data arriving at the egress edge units 160 to determine that the super packet data arrives at each of the egress edge units 160 at the scheduled time. The core controller 40 can monitor both the ingress edge units 60 via ingress control packet links 34 and the egress edge units 160 via egress control packet links 35 to monitor and control the overall router 50 synchronization. The core controller 40 can monitor ingress edge units 60 via ingress control packet links 34 to obtain management information (potentially including bandwidth, delay and quality of service information) to schedule the transmission of super packets from the ingress edge units 60. The core controller 40 monitors the egress edge units 160 via egress control packet links 35 to ensure the proper super packets arrive at each egress edge unit 160 at the proper time.

On the ingress edge unit 60 side, the packet scheduler 42 can receive and process control packet data from the ingress edge units 60 over the ingress control packet links 34 (e.g., using control packet processor 44). This information can be used by the congestion management module 46 to manage congestion along both the ingress super packet links 32 and along the egress super packet links 33. Based on the congestion management, the super packet scheduler 42 (e.g., using scheduler module 48) will schedule the super packets to be switched through the optical switch fabric 70 to be sent out of the optical switch fabric 70 onto the appropriate egress super packet link 33 destined for a particular egress edge unit 160. Transmission of super packets to optical switch fabric 70 can be scheduled so that no two super packets destined for the same egress edge unit arrive at optical switch fabric 70 at the same time. Additionally, transmission of packets to optical switch fabric 70 can be scheduled so that no two packets bound for the same egress edge unit arrive at optical switch fabric 70 at the same time, on the same wavelength, though packets on different wavelengths bound for the same ingress edge unit may be scheduled to arrive at the same time. For example, packets destined for the same egress edge unit arriving at the same ingress edge unit may be multiplexed together at the ingress edge unit for transmission to optical switch fabric 70. Alternatively, packets destined for the same egress edge unit which arrive at different ingress edge units could be multiplexed together at a WDM multiplexer (not shown) located between the ingress edge unit and optical switch fabric 70. Thus, multiplexed data packets bound for the same egress edge unit can arrive at the optical switch fabric 70 at approximately the same time.

Based on the control data information received from the ingress edge units 60 regarding the amount of and destinations for the super packets being built, the super packet scheduler 42 will develop a "pattern" that is delivered to the switch controller 38 for use by the switch controller 38 to open and close paths through the optical switch fabric 70. The pattern is established so as to avoid congestion and/or overload of the egress super packet links 33 between the optical switch fabric 70 and the egress edge units 160. The pattern can be established using any number of data characteristic, including delay and other types of quality of service requirements, type of data and other data characteristics.

On the egress edge unit 160 side, the core controller 42 can transmit and receive a variety of control data information from the egress edge units 160. The core controller 40 can monitor the egress edge units 160 to determine the amount of data arriving at each of the egress edge units 160. In this manner, the core controller 40 can establish or modify the super packet transmission pattern so that no egress edge unit 160 receives an amount of data that will exceed the buffering capacity of the egress edge unit 160.

It should be understood that while the present invention has primarily been described as a data transport product in which data packets are carried in various forms, the present invention can support circuit switched (TDM) data (as well as other forms of data), and could be used to replace large SONET based transmission or switching equipment. In order to facilitate circuit switched data and guarantee bandwidth, delay, and delay variation, rigid timing requirements can be imposed on the router of the present invention. The patterned super packet transmission and switching core optical cross-bar switch facilitates these rigid timing requirements, while simplifying the multitude of real-time hardware tasks that must be scheduled at wire speed throughout the router.

The router can include redundant central control units (not shown) that can distribute the system time-base to the ingress and egress edge units by way of the redundant control packet (fiber) links 34 connecting the switch core to each of these edge units (e.g., to each DWDM multiplexer and demultiplexer element). The router time-base can be derived from a variety of redundant, external sources. In one embodiment, the time-base or basic clock signal is 51.84 Mhz, the fundamental frequency of SONET transmission. At this frequency, SONET signals and tributaries can be recovered, as well as ordinary 64 Kbps DS0 voice transmission that is based on 8 kHz.

In this embodiment, the optical switch core can utilize the system time-base (51.84 Mhz) for all super packet and control packet transmissions to each edge unit. All of the super packet data between edge units and the optical switch core can be self-clocking and self-synchronizing. The edge unit will recover data, clock, and synchronization from the super packet data within the DWDM subsystems and together with the control packet link from the optical switch core generates a local master clock (51.84 Mhz) for all edge unit operations, including transmission of super packet data to the optical switch core.

The optical switch core can further utilize the control packet links for communication with each edge unit for JIT scheduling and verification of synchronization. The return path of this link from the edge unit back to the optical switch core is also based on the system time-base as recovered by the edge unit. It is from this path back to the optical switch core that the router extracts the edge unit time-base and determines that all the edge units are remaining in synchronization with the system time-base. These control packet links are duplicated between the optical switch core and all edge units, and therefore no single point of failure can cause a system time-base failure that would interrupt proper transmission and switching of super packet data throughout the system.

It should be understood that the router described with respect to FIGS. 3, 4 and 5 is provided to give context to the optical switch fabric of the present invention and is exemplary only. Other configurations of routers and/or switchers utilizing an optical switching fabric according to the present invention can be used to route data packets, super packets, multiplexed data packets etc., in a non-blocking fashion.

Figure 6:
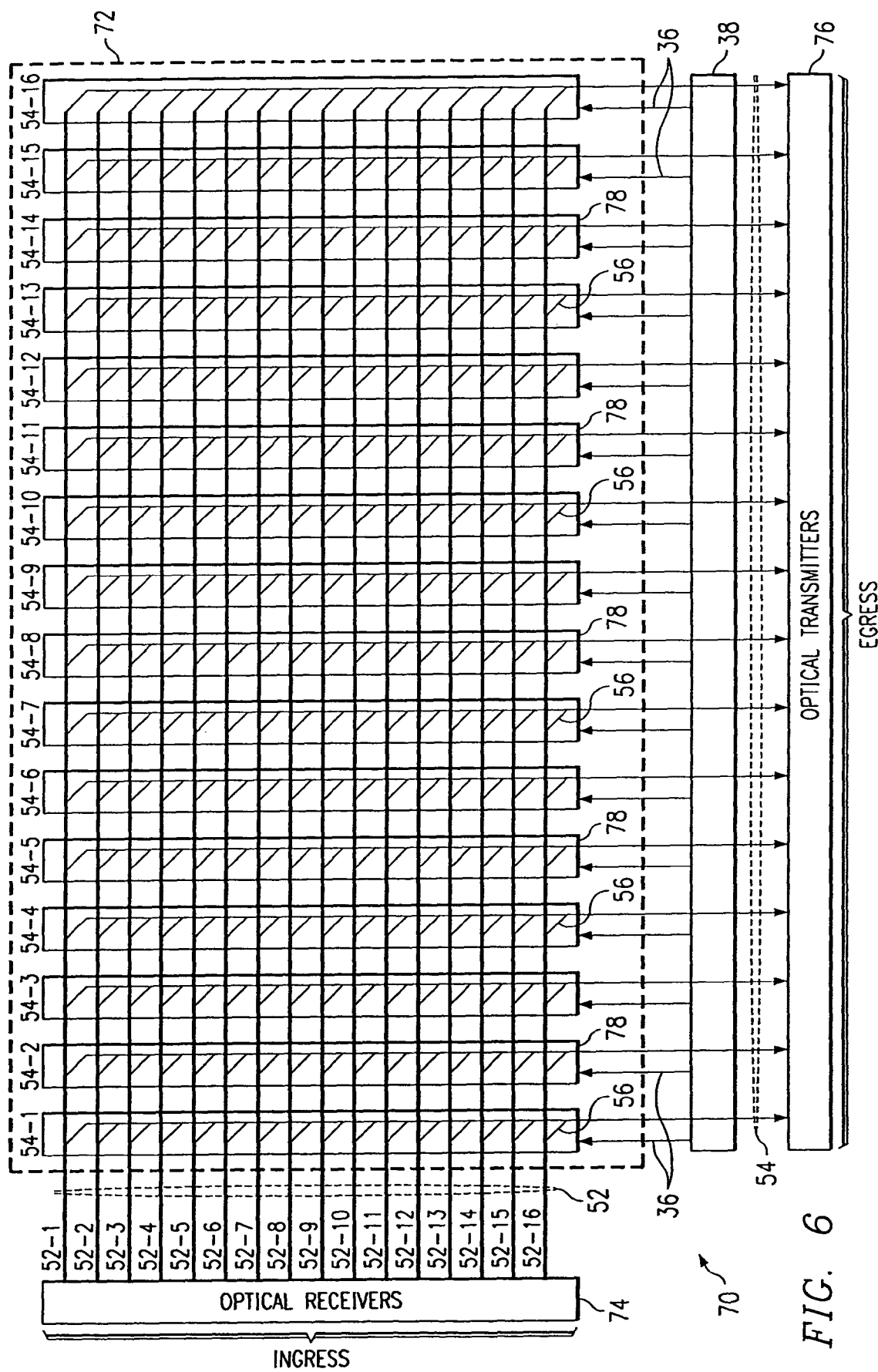
FIG. 6 shows an optical cross-bar switch embodiment of the optical switch fabric of FIG. 5.

FIG. 6 shows one embodiment of the optical switch fabric 70 of the present invention which includes an optical cross-bar switch 72. In the FIG. 6 embodiment, the switch controller 38 can be an integral part of optical switch fabric 70 (rather than a part of the core controller 40). Again, switch links 36 connect from the switch controller 38 to the optical cross-bar switch 72. Optical cross-bar switch 72 can optionally include optical receiver(s) 74 and optical transmitter(s) 76 which can be used to filter and/or amplify incoming signals upon receipt at the optical cross-bar switch 72 (i.e., at the optical receiver(s) 74) and just prior to exiting the optical cross-bar switch 72 (i.e., at the optical transmitter(s) 76) as necessary depending on the noise in the signals and the distance the signals must travel.

Optical cross-bar switch 72 can include an N×M switching matrix, where "N" can be the number of input data links and "M" can be the number of output data links serviced by the optical router 50 or other apparatus utilizing embodiments of the optical switch cross-bar switch of the present invention. The embodiment of FIG. 6 shows a 16×16 matrix of switching elements 78 in the optical cross-bar switch 72 for use in, for example, the sixteen data links 20, 2.5 Tbps optical router 50 configuration previously described. While the switching elements 78 can be semiconductor (silicon) optical amplifiers (SOAs), it should be understood that other switching elements that are capable of transporting optical data through the optical cross-bar switch 72 can be used. In the FIG. 6 embodiment, the switching elements 78 are shown as sixteen input, one output SOAs (16×1 SOAs), each of which is capable of routing from any of its sixteen inputs to its single output. Thus, an embodiment of the optical cross-bar switch 72 can comprise a set of sixteen switching elements 78 or SOAs 78, each of which is connected to sixteen switch input links 52 (labeled 52-1, 52-2 . . . 52-16) and a single switch output link 54 (labeled 54-1, 54-2 . . . 54-16). Each of the sixteen SOAs 78 can comprise sixteen path switches 56 with one path switch 56 located at each intersection of an input link 52 and an output link 54 within each SOA 78. In one embodiment of the present invention, closing an individual path switch 56 will allow optical data packets (e.g., super packets) to flow through that path switch 56 (i.e., the input link 52 to the output link 54 intersecting at the particular path switch 56), while opening the path switch 56 will cause optical data packets arriving at the particular path switch to continue on the input link. This "cross-bar" configuration of the optical switch fabric 70 allows for any optical data packet to travel from any input link 52 to any output link 54 of the optical cross-bar switch 72. Thus, in a 16×16 switch matrix, using sixteen 16 to 1 switching elements 78, there can be two hundred fifty six different paths through optical cross-bar switch 72. Additionally, the path switches can be configured to provide a plurality of unique paths, whereby no two input links will communicate data to the same output link in a given switching time interval (i.e., the time interval in which the optical cross-bar switch 72 is configured to provide a particular set of unique paths). It should be recalled, however, that packets from the same ingress edge unit or different ingress edge units that are bound for the same egress edge unit could be multiplexed together (e.g., via wavelength division multiplexing) and could arrive at the same input link 52 and be switched to the same output link 54 in the same switching time interval.

As the ability to send a greater number of wavelengths across a single optical fiber increases, the architecture of the optical switch core 30, incorporating an optical cross-bar switch 72, will process this increased number of wavelengths efficiently without changing the optical switch core base architecture. Furthermore, optical cross-bar switch 72 provides a configuration that facilitates broadcasting and multicasting of super packets. Any optical data packet (or aggregation thereof) arriving at the optical cross-bar switch 72 on a particular input 52 can be sent out to any single output 54, all outputs 54 simultaneously, or to some selection of the total number of outputs 54 (e.g., an optical data packet arriving on input link 52-1 can be replicated sixteen times and sent through each output link 54-1 through 54-16 simultaneously for a broadcast message). The embodiment optical cross-bar switch 72 provided in FIG. 6 provides the additional advantage of being single-stage switch that can be non-blocking without using buffering in the optical switch. It should be understood that the embodiment of the optical cross-bar switch 72 of FIG. 6 incorporating sixteen 16×1 SOAs is merely exemplary as other cross-bar configurations (e.g., N×M) that can pass any input to any output of the optical cross-bar switch 72 in a non-blocking manner, are equally applicable to the present invention.

In operation, optical data packets or super packets can be received at the optical receiver(s) 74 on the ingress side, amplified and/or filtered as necessary, and transmitted through the optical cross-bar switch 72 to the optical transmitter(s) 76 on the egress side of the optical cross-bar switch 72. In the FIG. 6 embodiment, switch controller 38 can communicate with the optical cross-bar switch 72 through one of sixteen switch links 36, as shown. Each of the sixteen switch links 36 connects to one of the SOAs 78 to open or close, as appropriate, the sixteen path switches 56 within the SOA 78 according to the schedule pattern derived by the super packet scheduler. For example, if an optical data packet needed to be sent from ingress edge unit I1 to egress edge unit E1, switch controller 38 would close path switch 56 at the intersection of 52-1 and 54-1, which would send the optical data packet from the optical receiver 74 through the optical cross-bar switch 72 along input link 52-1 to output link 54-1, and to optical transmitter 76 out of optical cross-bar switch 72. During operation, for any particular N×1 SOA 78, only one switch 56 will be closed at any one time, and subsequently only one path is available through any one N×1 SOA 78 at any given time to switch data packets, super packets, WDM multiplexed data packets or other optical packets.

When optical data packets are received from the ingress edge units 60, the optical data packets can be routed through the optical cross-bar switch 72 in a manner that avoids contention. The optical cross-bar switch 72 can provide a unique path between every ingress edge unit 60 and each egress edge unit 160. Thus, the flow path for an optical data packet can run from one ingress edge unit 60, through the ingress super packet link 32 associated with that ingress edge unit 60 to the optical cross-bar switch 72, through the unique path within the optical cross-bar switch 72 to one egress edge unit 160 over its associated egress super packet link 33. In this manner, optical data packets from ingress edge unit I1 that are intended for egress edge unit E2 can travel a distinct route through the optical cross-bar switch 72 (versus, for example, data packets from ingress edge unit I16 that are also intended for egress edge unit E2). Additionally, it should be recalled that the transmission of optical data packets to optical cross-bar 70 can be scheduled so that no two optical data packets (or, in alternative embodiments, sets of multiplexed data packets) destined for the same egress edge unit arrive at the optical cross-bar switch 72 at the same time. Therefore, contention physically cannot occur in the optical cross-bar switch 72 between different ingress edge units 60 sending data to the same egress edge unit 160.

In one embodiment of a router utilizing an optical switching architecture according to the present invention, the switch controller 38 can operate on two different time scales: one for the data path control and one for the control path control. For the data path, the switch controller 38 can apply a dynamic set of commands to the optical cross-bar switch 72 to operate the switching elements 78 within the optical cross-bar switch at wire speeds (i.e., switching the incoming optical data packets from input 52 to output 54 at the rate at which the optical data packets are arriving at the optical cross-bar switch 72) in order to open and close the unique paths that need to be traveled the optical data packets to get the optical data packets from an ingress edge unit 60 to an egress edge unit 160. For the control path, the switch controller 38 can apply a continually changing "pattern" to the optical cross-bar switch 72 to schedule the optical data packets transmission from the ingress edge units 60 over the ingress super packet links 32 through the optical cross-bar switch 72 and over the egress super packet links 33 to the egress edge units 160 in a manner that avoids contention. These scheduling patterns are determined by the super packet scheduler 42 over time and provided to the switch controller 38. Thus, the pattern applied by the switch controller 38 to the optical cross-bar switch 72 can change over time as determined by the super packet scheduler 42 in response to control data received from the ingress edge units 60.

In one embodiment, the super packets may be one microsecond in duration (including a guard band gap between each super packet) so that the optical cross-bar switch 72 must be able to switch every input 52 to every output 54 between the one microsecond boundaries. During the guard band gap, all of the switching elements 78 can be switched to change the entire optical cross-bar switch 72 configuration. In contrast, the super packet scheduler 42 may be determining and applying updated super packet scheduling patterns (based on different data flow detected at the ingress edge units) for time periods on the order of, for example, 1-10 milliseconds. Thus, the super packet scheduler 42 may be providing to the ingress edge units 60 a new "pattern" every 1-10 milliseconds, while providing the switch controller 38 a switching signal based on the active pattern that causes the switch controller 38 to update the optical cross-bar 75 configuration every 1 microsecond. Again, it should be recalled, that while embodiments of the present invention have been described primarily in terms of routing super packets, other embodiments of the present invention are equally applicable to routing individual data packets or other forms of aggregated data packets (e.g., WDM multiplexed data packets).

Figure 7:
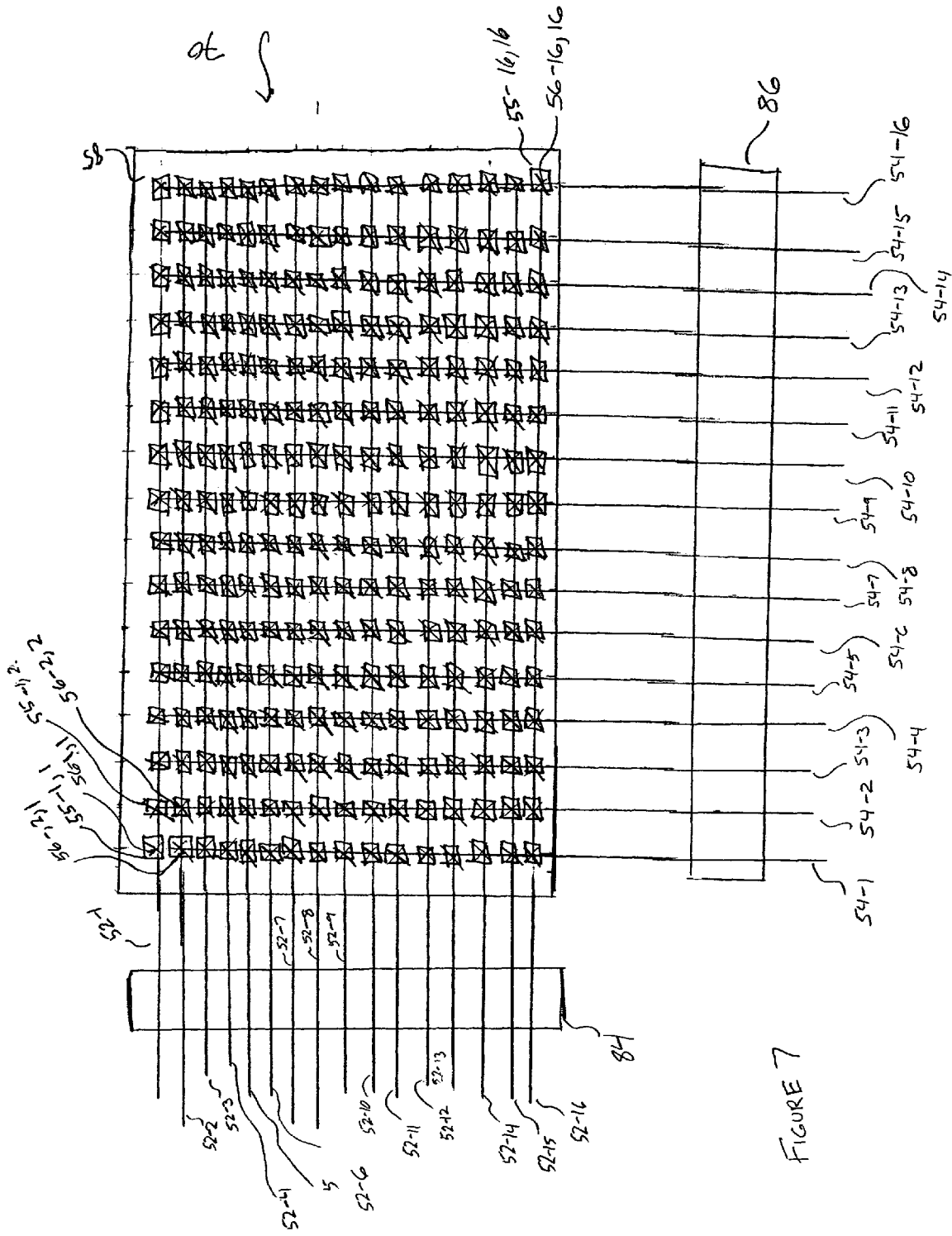
FIG. 7 shows an optical switching matrix embodiment of the optical switch fabric of FIG. 5.

FIG. 7 shows another embodiment of an optical switching matrix 85 that can be utilized in another embodiment of optical switch fabric 70. In the FIG. 7 embodiment, a N×M switching matrix, where N is the number of input data links and M is the number of output data links, is shown that includes 256 1×1 switching elements (labeled 55-1, 55-2 . . . 55-250), as opposed to the 16 16×1 switch elements of FIG. 6. Optical switch fabric 70 can once again optionally include optical receivers 84 and optical transmitters 86, which can be used to filter and/or amplify signals upon receipt at the optical switch fabric 70 (i.e., at the optical receivers 84) and just prior to exiting optical switch fabric 70 (i.e., at optical transmitters 86), as necessary, depending on the noise in the signals and the distance the signals must travel.

The embodiment of FIG. 7 shows a 16×16 switching matrix 85. In switching matrix 85, a 1×1 switch element (labeled 55-1,2, 55-2,2, 55-16,16) can be located at the intersection of each input link (labeled 52-1, 52-2 . . . 52-16) and each output link (labeled 54-1, 54-2 . . . 54-16) so that data can be transferred from an input link to an output link. Thus, 16 1×1 switching elements replace each 16×1 switching element of FIG. 16. Each switching element 55 can include a path switch (labeled 56-1,1, 56-1,2, 56-2,2 . . . 56-16,16) to switch optical data packets between an intersecting input link 52 to an intersecting output link 54. In one embodiment of the present invention, closing an individual path switch 56 will allow optical data (e.g., data packets, super packets, multiplexed data packets, etc.) to flow through the path switch 56 (i.e., from the input link 52 to the output link 54 intersecting at the particular path switch) while opening the path switch will cause super packets arriving at the particular path switch to continue on the input link. Thus, for example, if path switch 56-1,1 were closed, data packets arriving on input link 52-1 could be switched to output link 54-1. This configuration of switching matrix 85 allows for packets to travel from any input link 52 to any output link 54 of the switching matrix 85.

Additionally, packets can be switched from output links 54 to input links 52 by opening or closing path switches 56. Returning to the previous example, the data that was switched from input link 52-1 to output link 54-1 by closing path switch 56-1,1 can be transferred to input link 52-2 by opening packet switch 56-2, 1. The data packet can then be transferred to output link 54-2 by closing path switch 56-2,2. By configuring the path switches 56, data packets arriving at the switching matrix 85 can be routed to the output links without contention or congestion. Additionally, the path switches can be configured to provide a plurality of unique paths whereby no two input links will communicate data to the same output link in a given switching time interval (i.e., the time interval in which the switching matrix 85 is configured to provide a particular set of unique paths). As the ability to send a greater number of wavelengths across a single optical fiber increases, the architecture of optical switch fabric 70 incorporating the switching matrix 85 will process this increased number of wavelengths equally efficiently without changing the optical switch fabric 70's base architecture. Furthermore, switching matrix 85 provides a configuration that facilities broadcasting and multicasting of super packets. Any super packet arriving at the switching matrix 85 on a particular input 52 can be sent out to any single output 54, all outputs 54 simultaneously, or some selection of the total number of outputs 54 (e.g., a super packet arriving on input link 52-1 can be replicated 16 times and sent through each output link 54-1 through 54-16 simultaneously or for a broadcast message).

In operation, optical data packets or super packets can be received at the optical receivers 84 on the ingress side, amplified and/or filtered as necessary, and transmitted through the switching matrix 85 to the optical transmitters 86 on the egress side of the switching matrix 85. In the FIG. 7 embodiment, switch controller 38 can communicate with each path switch 56 through one of 256 switch links (not shown for the sake of simplicity). Each switch link can connect to a switching element 55 to open or close the path switch 56 according to a schedule pattern derived by the super packet scheduler. For example, if a super packet needed to be sent from ingress edge unit I1 to egress edge unit E1, switch controller 38 could close path switch 56-1,1 at the intersection of input link 52-1 and output link 54-1, which would send the super packet from the optical receiver 74 through the optical switching matrix 85 along input line 52-1 to output line 54-1 and to optical transmitter 76 and out of switching matrix 85. Super packets can be routed through switching matrix 85 in a manner than avoids contention, and switching matrix 85 can provide a unique path between every ingress edge unit 60 and each egress edge unit 160. Thus, the flow path for a super packet can run from one ingress edge unit 60, through the ingress super packet link 32 associated with the ingress edge unit 60, to the optical switching matrix 85, through the unique path within the optical switching matrix 85, to one egress edge unit 160 over its associated super packet link 33. In this manner, super packets from ingress edge unit I1 that are intended for egress edge unit E2 can travel a distinct route through the switching matrix 85 versus, for example, data packets from ingress edge unit I16 that are intended for egress edge unit E2.

It should be recalled that the transmission of individual data packets, super packets or data packets in multiplexed format, can be scheduled to avoid contention. For example, data packets destined for the same egress edge unit can be transmitted to switching matrix 85 in multiplexed format for routing. However, no two sets of multiplexed data packets destined for the same egress edge unit with contending (or overlapping) wavelengths will be sent to switching matrix 85 during the same switching time interval. In this example, because multiple sets of multiplexed data packets destined for the same egress edge unit will not be sent to switch matrix 85 in the same switching time interval, and because sets of multiplexed data packets arriving in the same switching time interval will travel different unique paths, contention cannot occur in switching matrix 85.

Figure 8:
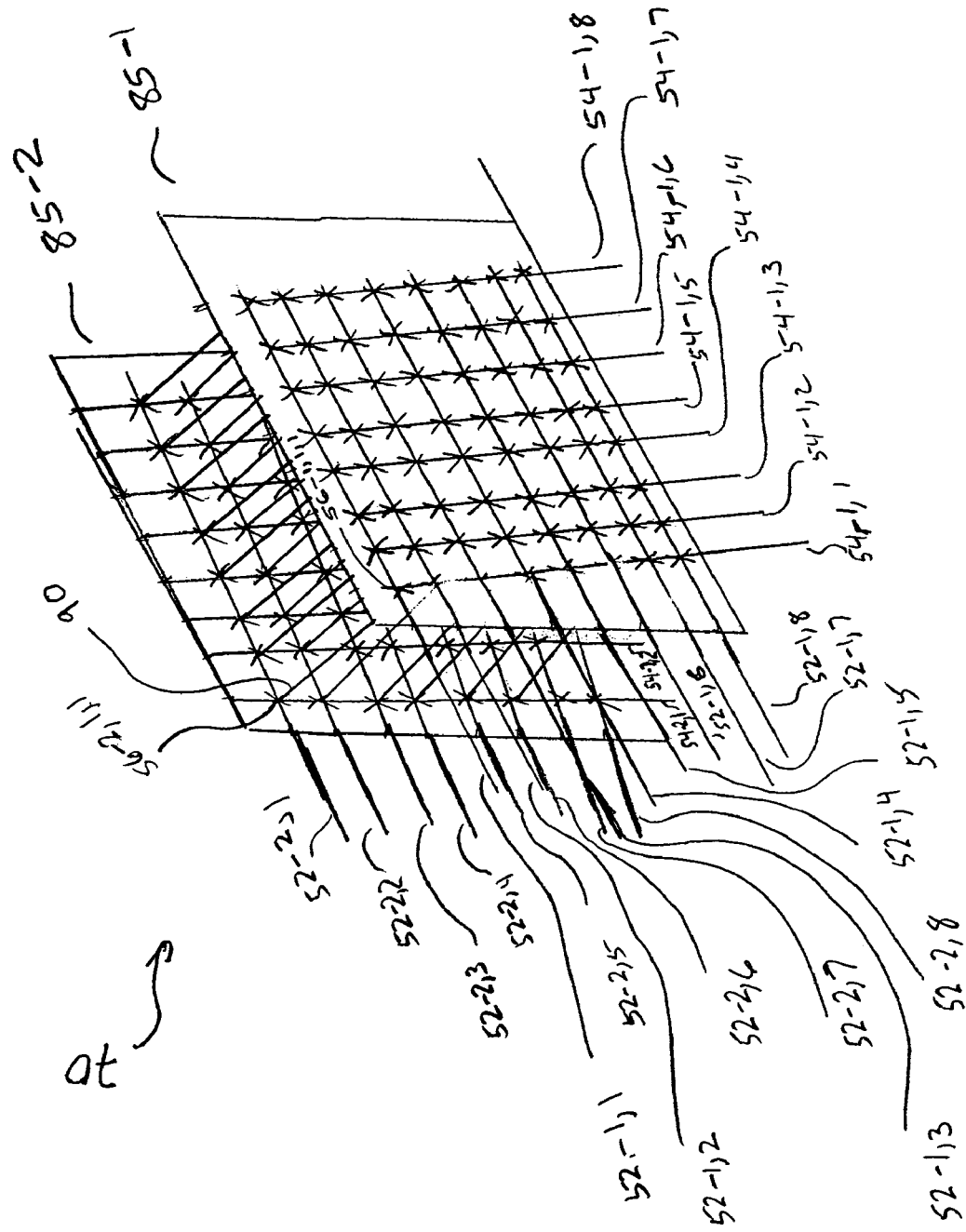
FIG. 8 shows another optical switching matrix embodiment of the optical switch fabric of FIG. 5.

FIG. 8 illustrates yet another embodiment of optical switch fabric 70 according to the present invention that includes multiple switching matrices within switch fabric 70. In the embodiment of FIG. 8, multiple switching matrices labeled 85-1 and 85-2 can be configured to be in communication with each other. In other words, multiple individual switching matrices such as those described in conjunction with FIGS. 6 and 7 can be linked together and can communicate optical data packets between one another. Each switching matrix can include multiple input links. For switching matrix 85-1, the multiple input links are labeled 52-1,1 through 52-1,8, while the input links for switch matrix 85-2 are labeled 52-2,1 through 52-2,8. Each switching matrix can also include a plurality of output links (labeled 54-1,1 through 54-1,8 and 54-2,1 through 54-2,2). Again, a path switch could be located at each intersection between an input link and an output link (labeled 56-1,1,1, 56-1,1,2, and so on). Thus, a data packet or super packet arriving on link 52-1,1 could be routed to a particular output link, such as 54-1,1, by closing a path switch 56 (e.g., path switch 56-1,1,1). Additionally, data packets arriving at switching matrix 85-2 can be routed to switching matrix 85-1 on cross connect links (e.g., cross connect link 90). By closing path switch 56-2,1,1, for example, a data packet can be routed to cross connect link 90 from input link 52-2,1, and then, by closing path switch 56-1,1,1, the data packet could be routed to output link 56-1,1. It should be noted that each path switch 56 can be associated with a switching element, such as a 1×1 SOA. However, the switching elements have been omitted from FIG. 8 for the sake of simplicity.

The path switches can be configured to provide a plurality of unique paths through optical switch fabric 70. The switch controller (not shown) can close path switches at each intersection to route data packets through optical switch fabric 70 without contention. In operation, optical data packets or super packets can be received at optical receivers (not shown) on the ingress side of the switch matrices, amplified and/or filtered as necessary, and transmitted through the switch matrices 85 to optical transmitter (not shown) on the egress side of the optical matrixes 85. In the FIG. 8 embodiment, switch controller 38 can communicate with the switch matrixes through switch links (not shown). Each of the switch links can connect to a path switch to open or close the path switch as appropriate, according to a schedule pattern derived by the super packet scheduler 42. The transmission of data packets and/or super packets can also be scheduled so that data packets or super packets destined for the same egress edge unit are not transmitted to arrive at the optical switch fabric 70 in the same switching time interval.

Super packet scheduler 42 can also schedule multiplexing of data packets prior to sending the data packets to optical switch fabric 70. For example, if two data packets bound for the same egress edge unit arrive on separate input lines 28 at the same ingress edge unit, super packet scheduler 48 can schedule the data packets to be multiplexed together (e.g., at a multiplexer located at an ingress edge unit) for transmission to optical switch fabric 70 via the same channel (e.g., the two data packets can be wavelength division multiplexed). Optical switch fabric 70 can then switch the WDM multiplexed packets. In an alternative embodiment of a router utilizing the optical switch fabric according to the present invention, a WDM multiplexer can be located between the ingress edge units and optical switch fabric 70. Packet scheduler 48 can schedule the transmission of packets so that the packets destined for the same egress edge unit from different ingress edge units can be multiplexed together for transmission to optical switch fabric 70. Optical switch fabric 70 can receive several packets destined for the same egress edge unit multiplexed together over the same input link 52. The set of multiplexed data packets can then be routed along a unique path to the destination egress edge unit (e.g., the destination egress edge unit for each of the associated data packets).

Furthermore, optical switch fabric 70, employing multiple switch matrixes 85, can also provide broadcasting and multicasting capabilities. Any super packet arriving at switching matrixes 85-1 or 85-2 on a particular input 52 can be sent out to any single output 54, all outputs 54 simultaneously, or to some selection of the total number of outputs 54. It should be noted that the configuration of optical switch fabric 70 shown is exemplary only, and that the optical switch fabric can include as many input links and output links as necessary to route data through router 50 without contention. Additionally, as the bandwidth demands increase, additional switching matrixes 85 can be added. Thus, cross connect link 90 could connect to a third or fourth switching matrix or any number of additional switching matrixes. Additionally, as the ability to send a greater number of wavelengths across a single optical fiber increases, the architecture of optical switch fabric 70 will be able to process this increased number of wavelengths equally efficiently without changing the switch fabric architecture.

As can be understood from the foregoing discussion, embodiments of the present invention provide an optical switching architecture that provides non-blocking routing of data packets. The switching architecture of the present invention includes a switch fabric that provides a unique switch path from each input link to each output link, to ensure that no blocking or congestion will occur at the switch fabric. Additionally, the optical switching architecture of the present invention is highly scalable and can easily accommodate the ability to send a greater number of wave lengths across a single optical link.

Although the present invention has been described in detail herein with reference to the illustrative embodiments, it should be understood that the description is by way of example only and is not to be construed in a limiting sense. It is to be further understood, therefore, that the numerous changes in the details of the embodiments of this invention and additional embodiments of this invention will be apparent to and may be made by persons of ordinary skill in the art having reference to this description. It is contemplated that all such changes in additional embodiments are within the spirit and true scope of this invention as claimed below.

What is claimed is:

1. An optical switch fabric, comprising:
   at least one optical switching matrix comprising
      a plurality of input links;
      a plurality of output links, wherein each of the plurality of input links intersects with each of the plurality of output links;
      a plurality of path switches with one path switch located at each intersection of an input link and an output link;
      a core controller to ensure the capacity of the plurality of the output links is not exceeded;
      a plurality of ingress edge units linked to the core controller via the plurality of input links;
      a plurality of egress edge units linked to the core controller via the plurality of output links;
      a packet scheduler to receive and process a plurality of control packet data links; and
      a switch controller that coordinates switching based on information processed from the plurality of ingress edge units,
      wherein each of the plurality of path switches is operable to communicate optical data from intersecting input link to an intersecting output link, and
      wherein each of the plurality of path switches is configurable to close or open to create a plurality of unique paths in a given switching time interval for transporting the optical data through the optical switching matrix without contention or congestion.

2. The optical switch fabric of claim 1, wherein each path switch is associated with a switching element.

3. The optical switch fabric of claim 2, wherein each switching element is a semiconductor optical amplifier (SOA).

4. The optical switch fabric of claim 1, wherein only one input can communicate data to a particular output in a switching time interval.

5. The optical switch fabric of claim 1, wherein the optical switching matrix is operable to switch wavelength division multiplexed traffic.

6. The optical switch fabric of claim 1, further comprising an optical receiver operable to filter and amplify signals arriving at the optical switching matrix.

7. The optical switch fabric of claim 1, further comprising an optical transmitter operable to filter and amplify signals leaving the optical switching matrix.

8. The optical switch fabric of claim 1, wherein the at least one optical switching matrix is in communication with the packet scheduler that establishes a schedule pattern for the at least one optical switching matrix;
   wherein a switch controller in communication with the packet scheduler is operable to configure the optical switching matrix according to the schedule pattern; and
   wherein a plurality of switch links connects the switch controller to each of the plurality of path switches, wherein the switch links communicate signals from the switch controller to the path switches to open or close the path switches according to the schedule pattern.

9. Presented) The optical switch fabric of claim 8, wherein the packet scheduler is further operable to schedule multiplexing of data packets.

10. The optical switch fabric of claim 1, wherein the plurality of unique paths allows an optical data packet or an aggregation thereof arriving at the optical switching matrix to be sent to all outputs simultaneously, to a selection thereof, or to one single output.

11. An optical switching core comprising:
    a plurality of switching matrices, each switching matrix further comprising:
       a plurality of inputs;
       a plurality of outputs, wherein at least one input at a switching matrix intersects with at least one output at the switching matrix; and
       a plurality of path switches, wherein a path switch is located at each intersection between an input and an output and wherein the path switch at each intersection is operable to communicate data from the intersecting input to the intersecting output, core controller to ensure the capacity of the plurality of the output links is not exceeded;

a plurality of ingress edge units linked to the core controller via the plurality of inputs;

a plurality of egress edge units linked to the core controller via the plurality of outputs;

a packet scheduler to receive and process a plurality of control packet data links;

a switch controller that coordinates switching based on information processed from the plurality of ingress edge units, and a plurality of cross links linking each of the plurality of switching matrices to at least one other switching matrix.

12. The optical switching core of claim 11, wherein each path switch is associated with a different switching element.

13. The optical switching core of claim 12, wherein each switching element is a semiconductor optical amplifier (SOA).

14. The optical switching core of claim 11, wherein data traffic can be routed from one switching matrix to another switching matrix via at least one cross link from the plurality of cross links.

15. The optical switching core of claim 11, wherein only one input can communicate data to a particular output in a switching time interval.

16. The optical switching core of claim 11, wherein the optical switching core is operable to switch wavelength division multiplexed traffic.

17. The optical switching core of claim 11, further comprising an optical receiver operable to filter and amplify signals arriving at the optical switching core.

18. The optical switching core of claim 11, further comprising an optical transmitter operable to filter and amplify signals leaving the optical switching core.

19. The optical switching core of claim 11, wherein
the packet scheduler establishes a schedule pattern for the optical switching core;
the switch controller communicates with the packet scheduler operable to configure the optical switching core according to the schedule pattern; and
a plurality of switch links connecting the switch controller to each of the plurality of path switches, wherein the switch links communicate signals from the switch controller to the path switches to open or close the path switches according to the schedule pattern.

20. The optical switching core of claim 11, wherein the packet scheduler is further operable to schedule multiplexing of data packets.

21. The optical switching core of claim 11, wherein each input intersects with each output.

22. An optical cross-bar switch comprising:
a plurality of input links;
a plurality of output links;
a plurality of switching elements, each switching element further comprising a plurality of path switches connecting at lest one of the plurality of input links to at least one of the plurality of output links;
core controller to ensure the capacity of the plurality of the output links is not exceeded;
a plurality of ingress edge units linked to the core controller via the plurality of input links;
a plurality of egress edge units linked to the core controller via the plurality of output links; and
a packet scheduler to receive and process a plurality of control packet data links a switch controller that coordinates switching based on information processed from the plurality of ingress edge units,
wherein the plurality switching elements are configured to create a plurality of unique paths through the optical cross-bar switch in a given switching time interval.

23. The optical cross-bar switch of claim 22, wherein the switching elements are N to 1 switching elements, where N is equal to the number of the plurality of input links, for switching data packets received on any of the N input links to one of the plurality of output links.

24. The optical cross-bar switch of claim 23, wherein each of the N to 1 switching elements comprises an N to 1 semiconductor optical amplifier.

25. The optical cross-bar switch of claim 24, wherein only one input link at each of the plurality of switching elements can communicate data to the one output link at each of the plurality of switching elements during a switching time interval.

26. The optical cross-bar switch of claim 22, wherein the optical cross-bar switch is operable to switch wavelength division multiplexed data packets.

27. The optical cross-bar switch of claim 22, wherein there is at least one output link for each input link.

28. The optical cross-bar switch of claim 22, wherein each switching element has sufficient bandwidth to accommodate all the wavelengths upon which data packets are transported.

29. The optical cross-bar switch of claim 22, further comprising an optical receiver configured to filter and amplify incoming signals.

30. The optical cross-bar switch of claim 22, further comprising an optical transmitter operable to filter and amplify outgoing signals.

31. The optical cross-bar switch of claim 22, wherein
the packet scheduler establishes a schedule pattern for the optical cross-bar switch;
the switch controller communicates with the packet scheduler operable to configure the optical cross-bar switch according to the schedule pattern; and
a plurality of switch links connecting the switch controller to each of the switching elements,
wherein the switch links communicate signals from the switch controller to the switching elements to open or close the plurality of path switches according to the schedule pattern.

32. The optical cross-bar switch of claim 31, wherein the packet scheduler is further operable to schedule multiplexing of data packets.

33. The optical cross-bar switch of claim 22, wherein the switching elements are N to M switching elements, where N is equal to the number of the plurality of input links and M is equal to the number of the plurality of output links, for switching data packets received on any of the N input links to any of the M output links.

34. The optical cross-bar switch of claim 22, wherein the switching elements are 1 to M switching elements, where M is equal to the number of the plurality of output links, for switching data packets received on any one of the input links to any of the M output links.

35. An optical switch for providing a concurrent unique switch path from any of a plurality of input links to any of a plurality of output links comprising:
an array of N to 1 switching elements, where N is equal to the number of the plurality of input links, each switching element further comprising a plurality of path switches connecting each of the N input links to one output link;

core controller to ensure the capacity of the plurality of the output links is not exceeded;
a plurality of ingress edge units linked to the core controller via the plurality of input links;
a plurality of egress edge units linked to the core controller via the plurality of output links; and
a packet scheduler to receive and process a plurality of control packet data links
a switch controller that coordinates switching based on information processed from the plurality of ingress edge units,
wherein the plurality of switching elements are configurable to create a plurality of unique paths through the optical cross-bar switch in a given switching time interval.

36. The optical switch of claim 35, wherein each switching element is a semiconductor optical amplifier.

37. The optical switch of claim 35, wherein only one input link at each switching element can transfer data packets to the one output link at each switching element during a switching time interval.

38. The optical switch of claim 35, wherein the optical switch is operable to switch wavelength division multiplexed data traffic.

39. The optical switch of claim 35, wherein there are at least N switching elements.

40. The optical switch of claim 35, wherein each switching element has sufficient bandwidth to accommodate all the wavelengths upon which data packets are transported.

41. The optical switch of claim 35, further comprising an optical receiver coupled to each of the plurality of input links, wherein the optical receiver is operable to filter and amplify incoming signals.

42. The optical switch of claim 35, further comprising an optical transmitter coupled to each of the plurality of output links, wherein the optical transmitter is operable to filter and amplify outgoing signals.

43. The optical switch of claim 35, wherein
the packet scheduler establishes a schedule pattern for the optical switch;
the switch controller communicates with the packet scheduler operable to configure the optical switch according to the schedule pattern; and
a plurality of switch links connecting the switch controller to each of the switching elements, wherein the switch links communicate signals from the switch controller to the switching elements to open or close the path switches according to the schedule.

44. The optical switch of claim 43, wherein the packet scheduler is further operable to schedule multiplexing of data packets.

45. An optical router comprising:
a plurality of ingress edge units;
a plurality of egress edge units;
an optical switch core further comprising:
an optical switching matrix further comprising:
a plurality of inputs;
a plurality of outputs, wherein at least one input intersects with at least one output;
a plurality of path switches with at least one path switch at each intersection between an input and an output operable to communicate data from the intersecting input to the intersecting output, wherein the plurality of path switches is configurable to create a plurality of unique paths through the optical switching matrix in a given switching time interval;
a core controller further comprising:
a packet scheduler that establishes a schedule pattern for the optical switching matrix;
core controller to ensure the capacity of the plurality of the output links is not exceeded,
a switch controller that coordinates switching based on information processed from the plurality of ingress edge units,
wherein the switch controller in communication with the packet scheduler operable to configure the optical switching matrix according to the schedule pattern,
wherein the plurality of ingress edge units are linked to the switch controller via the plurality of inputs, and the plurality of egress edge units are linked to the core controller via the plurality of outputs; and
a packet scheduler to receive and process a plurality of control packet data links, and
a plurality of switch links connecting the switch controller to each of the path switches, wherein the switch links communicate signals from the switch controller to the path switches to open or close the path switches according to the schedule pattern.

46. The optical router of claim 45, wherein the optical switching matrix is operable to:
receive a plurality of data packets from each of the plurality of ingress edge units, wherein each data packet is bound for an associated destination egress edge unit; and
route each of the data packets to the data packet's associated destination egress edge unit according to the plurality of unique paths.

47. The optical router of claim 45, wherein the packet scheduler is further operable to schedule multiplexing of data packets at each of the ingress edge units such that data packets bound for the same egress edge unit are multiplexed together into sets of multiplexed data packets.

48. The optical router of claim 47, wherein the packet scheduler is further operable to schedule the transmission of the sets of multiplexed data packets from each ingress edge unit so that only one set of multiplexed data packets destined for a particular egress edge unit arrives at the optical switching matrix in a switching time interval.

49. The optical router of claim 45, wherein the packet scheduler monitors the plurality of ingress edge units to determine a transmission pattern for each of the plurality of ingress edge units, wherein the transmission pattern prompts each ingress edge unit to transmit super packets to the optical switching matrix so that no two super packets destined for the same egress edge unit arrive at the optical switching matrix in a switching time interval.

50. The optical router of claim 45, further comprising a plurality of switching elements connecting the inputs to the outputs.

51. The optical router of claim 50, wherein the switching elements are N to 1 switching elements, where N is equal to the number of the plurality of inputs, for switching data packets received on any of the N inputs to one of the plurality of outputs.

52. The optical router of claim 51, wherein each of the N to 1 switching elements comprises an N to 1 semiconductor optical amplifier.

53. The optical router of claim 50, wherein there is at least one output for each input.

54. The optical router of claim 50, wherein each switching element has sufficient bandwidth to accommodate all the wavelengths upon which data packets are transported.

55. The optical router of claim 45, wherein the optical switch core further comprises an optical receiver configured to filter and amplify incoming signals.

56. The optical router of claim 45, wherein the optical switch core further comprises an optical transmitter operable to filter and amplify outgoing signals.

57. A method of routing optical data packets comprising:
determining patterns for delivery of optical data packets from a plurality of ingress edge units of an optical router to a plurality of egress edge units of the optical router;
according to the patterns, coordinating closing and opening path switches within an optical switching matrix to create a plurality of unique paths through the optical switching matrix in a given switching time interval;
ensuring capacity of the plurality of output links is not exceeded with core controller;
receiving and processing a plurality of control packet data links with a packet scheduler;
coordinating switching based on information processed from the plurality of ingress edge units with a switch controller; and
routing each optical data packet to an output or outputs via the plurality of unique paths within the optical switching matrix,
wherein the plurality of ingress edge units are linked to the core controller via a plurality of input links and the plurality of egress edge units are linked to the core controller via a plurality of output links.

58. The method of claim 57, further comprising:
receiving a plurality of data packets via a plurality of inputs;
routing the data packets to a plurality of outputs according to the plurality of unique paths.

59. The method of claim 58, wherein the step of receiving a plurality of data packets further comprises receiving a single data packet on each of the plurality of inputs in a switching time interval.

60. The method of claim 58, wherein each of the plurality of inputs is connected to a different one of the plurality of ingress edge units.

61. The method of claim 58, further comprising routing each single data packet to a different one of the plurality of outputs according to the plurality of unique paths.

62. The method of claim 61, wherein each of the plurality of outputs is connected to a different one of the plurality of egress edge units.

63. The method of claim 57, further comprising multicasting the data packet arriving at the input to a plurality of outputs.

* * * * *

UNITED STATES PATENT AND TRADEMARK OFFICE
CERTIFICATE OF CORRECTION

PATENT NO.         : 7,526,203 B2
APPLICATION NO. : 10/659485
DATED                  : April 28, 2009
INVENTOR(S)       : Lakshman S. Tamil It is certified that error appears in the above-identified patent and that said Letters Patent is hereby corrected as shown below:

Claim 9, column 16, line 50, please delete "Presented)";

Claim 11, column 17, line 3, please correct "core controller" to read "a core controller";

Claim 22, column 17, line 62, please correct "core controller" to read "a core controller";

Claim 35, column 19, line 1, please correct "core controller" to read "a core controller"; and Claim 45, column 20, line 4, please correct "core controller" to read "a core controller".

Signed and Sealed this

Twenty-second Day of September, 2009

David J. Kappos
*Director of the United States Patent and Trademark Office*